United States Patent
Zhao et al.

(10) Patent No.: US 11,717,020 B2
(45) Date of Patent: Aug. 8, 2023

(54) BUBBLE REMOVAL PREPARATION DEVICE AND METHOD FOR GEL-STATE ELECTRONIC LIQUID (E-LIQUID)

(71) Applicant: CHINA TOBACCO YUNNAN INDUSTRIAL CO., LTD, Kunming (CN)

(72) Inventors: Wei Zhao, Kunming (CN); Yunhua Qin, Kunming (CN); Liu Hong, Kunming (CN); Yi Han, Kunming (CN); Xia Zhang, Kunming (CN); Tinghua Li, Kunming (CN); Shoubo Li, Kunming (CN); Xiaowei Gong, Kunming (CN); Liu Yang, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/927,367

(22) PCT Filed: Mar. 4, 2021

(86) PCT No.: PCT/CN2021/079139
§ 371 (c)(1),
(2) Date: Nov. 23, 2022

(87) PCT Pub. No.: WO2022/165896
PCT Pub. Date: Aug. 11, 2022

(65) Prior Publication Data
US 2023/0189871 A1    Jun. 22, 2023

(30) Foreign Application Priority Data

Feb. 4, 2021 (CN) .......................... 202110158498.4

(51) Int. Cl.
*B01D 19/00* (2006.01)
*A24B 15/18* (2006.01)
*A24B 15/167* (2020.01)

(52) U.S. Cl.
CPC ............ *A24B 15/18* (2013.01); *A24B 15/167* (2016.11); *B01D 19/0036* (2013.01)

(58) Field of Classification Search
CPC .... B01D 19/0036; A24B 15/167; A24B 15/18
See application file for complete search history.

(56) References Cited

U.S. PATENT DOCUMENTS 5,240,016 A * 8/1993 Nichols ................ A24B 15/165
                                                                131/194
10,772,352 B2 * 9/2020 Mishra .................... A24F 40/42
(Continued)

FOREIGN PATENT DOCUMENTS

CN         1438193 A      8/2003
CN       105212273 A      1/2016
(Continued)

*Primary Examiner* — Abdullah A Riyami
*Assistant Examiner* — Thang H Nguyen
(74) *Attorney, Agent, or Firm* — Bayramoglu Law Offices LLC

(57) ABSTRACT

A bubble removal preparation device and method for a gel-state electronic liquid (e-liquid) are provided. The preparation device includes a negative-pressure chamber and a cooling element, where the negative-pressure chamber is provided therein with a porous e-liquid containing chamber. A temperature controller is configured to control the temperature of the cooling element, and a gap between the porous e-liquid containing chamber and the cooling element forms an e-liquid containing cavity.

10 Claims, 1 Drawing Sheet

(56) References Cited

U.S. PATENT DOCUMENTS

| | | | | |
|---|---|---|---|---|
| 11,246,348 B1* | 2/2022 | Han | ...................... | A24F 40/465 |
| 2003/0154743 A1* | 8/2003 | Lee | ........................ | C03B 19/12 |
| | | | | 65/17.2 |
| 2022/0039474 A1* | 2/2022 | Han | ........................ | A24F 40/50 |

FOREIGN PATENT DOCUMENTS

| | | | |
|---|---|---|---|
| CN | 106998811 A | 8/2017 | |
| CN | 107050933 A | 8/2017 | |
| CN | 108095199 A | 6/2018 | |

* cited by examiner

BUBBLE REMOVAL PREPARATION DEVICE AND METHOD FOR GEL-STATE ELECTRONIC LIQUID (E-LIQUID)

CROSS REFERENCE TO THE RELATED APPLICATIONS

This application is the national phase entry of International Application No. PCT/CN2021/079139, filed on Mar. 4, 2021, which is based upon and claims priority to Chinese Patent Application No. 202110158498.4, filed on Feb. 4, 2021, the entire contents of which are incorporated herein by reference.

TECHNICAL FIELD

The present disclosure belongs to the field of e-cigarettes and, in particular, relates to a bubble removal preparation device and method for a gel-state e-liquid.

BACKGROUND

The demand by people for a reduction in the harmful effects of cigarette smoking has promoted the birth and rapid development of e-cigarettes. Nicotine, flavorings, and others are dissolved in solvents, such as glycerol, propylene glycol, or other polyols to make the e-liquid, which serves as the aerosol-producing material of the e-cigarette. The e-liquid is filled into a smoking device and conveyed to an atomizer in the smoking device through e-liquid guide cotton or other guide elements. The e-liquid in the atomizer is heated by an electric heating element to atomize and form an aerosol similar to that of conventional cigarettes for the user to inhale.

However, in actual assembly, the e-liquid container, the e-liquid guide cotton, and the electric heating element of the smoking device may have poor sealing performance due to their inconsistent sizes. In addition, even if sealing performance is good during leaving factory, during subsequent storage, transportation, and use, the sealing performance may be impaired due to vibration and collision. As a result, the e-liquid may leak, thereby affecting the user's experience. To solve the leakage problem, it has been proposed to turn the e-liquid serving as the aerosol-producing material into a gel state. According to reports about the gel-state e-liquid, a gelling agent is often used to make the e-liquid solidify into a gel state (jelly or solid). The gelling agent usually has the property of thermo-reversible phase transition, which solidifies the e-liquid into a gel at a low temperature, liquefies the e-liquid after being heated, and solidifies the e-liquid into a gel again after being cooled.

However, new problems arise in the practical use of the gel-state e-liquid. At present, the gel-state e-liquid is often prepared by simply mixing a gel factor (gelling agent or thickening agent), a flavoring, and an atomizing agent, which only aims at obtaining the gel-state e-liquid after mixing. Air will inevitably be introduced in the mixing process, and there will be bubbles of different sizes in the gel-state e-liquid formed after cooling. As a result, the gel-state e-liquid has uneven appearances, low transparency, and low aesthetic quality, which seriously affects the user's inhalation experience and visual enjoyment.

The present disclosure is intended to solve most, if not all, of the above problems.

SUMMARY

The first aspect of the present disclosure provides a bubble removal preparation device for a gel-state e-liquid. The preparation device includes a negative-pressure chamber 1 with a negative-pressure suction device. The negative-pressure chamber 1 is provided therein with a porous e-liquid containing chamber 2. The porous e-liquid containing chamber 2 is provided therein with a cooling element 3. A gap between an inner wall of the porous e-liquid containing chamber 2 and an outer wall of the cooling element 3 forms an e-liquid containing cavity 4.

A side wall of the porous e-liquid containing chamber 2 is provided with holes that allow aerosol to pass through but not an e-liquid.

Preferably, the holes each have a regular or irregular shape and have an equivalent diameter of 0.01-2 mm.

Preferably, the side wall of the porous e-liquid containing chamber 2 has a mesh structure with pores, and the pores have an equivalent diameter of 0.01-2 mm and are equivalent to the holes.

Preferably, the negative-pressure chamber 1 is further provided therein with a temperature controller 1-3, which is connected to the cooling element 3 and configured to control the temperature change of the cooling element 3.

The cooling element 3 is a metal heating tube or a ceramic tube printed with a heating coating or heating circuit, and the temperature controller 1-3 is a control board configured to control the power supplied to the cooling element 3.

Preferably, the e-liquid containing cavity 4 is a hollow cylinder or rectangular solid, which has a wall thickness of 0.2-1.5 cm.

Preferably, the negative-pressure chamber 1 is provided thereon with an openable upper cover 1-1.

Preferably, the negative-pressure chamber 1 is further provided therein with a base 1-2, and the temperature controller 1-3 is provided in the base 1-2 and electrically connected to the cooling element 3.

The negative-pressure chamber 1 can be any existing suitable negative-pressure chamber. For example, the negative-pressure chamber 1 further includes an exhaust tube, which is connected to the negative-pressure suction device and the porous e-liquid containing chamber 2, and a pressure sensor for detecting pressure in the negative-pressure chamber 1, etc. The negative-pressure suction device can be selected from a micro vacuum pump, etc.

The preparation device further includes a temperature sensor for measuring a temperature of an outer wall of the cooling element 3. The temperature sensor can include one or more thermocouples arranged on the outer wall of the cooling element 3.

The negative-pressure suction device and the exhaust tube can also be arranged in the base 5.

Preferably, the preparation device further includes an operation display screen 1-4 provided on an outer wall of the negative-pressure chamber 1. The operation display screen 1-4 is communicated with the negative-pressure suction device, the temperature controller 1-3, the pressure sensor, and the temperature sensor to operate the negative-pressure suction device and temperature controller 1-3 and display pressure and temperature data of the pressure sensor and the temperature sensor in real-time.

The preparation device is provided with a power supply, which supplies power to the temperature controller 1-3, the negative-pressure suction device, and the operation display screen 1-4.

Preferably, the cooling element 3 is a cylinder or a rectangular solid.

Preferably, the porous e-liquid containing chamber 2 is a hollow cylinder or rectangular solid.

Preferably, the porous e-liquid containing chamber 2 is coaxial with the cooling element 3.

The second aspect of the present disclosure provides a preparation method for a high-penetration gel-state e-liquid, which uses the bubble removal preparation device for the gel-state e-liquid described in the first aspect of the present disclosure. The preparation method includes the following steps:

preparing a sol-state e-liquid, which has bubbles naturally mixed during preparation;

controlling the temperature of the outer wall of the cooling element 3 and controlling an initial temperature of the outer wall of the cooling element to be greater than or equal to a temperature of the sol-state e-liquid; and opening the negative-pressure chamber 1 and pouring the sol-state e-liquid into the e-liquid containing cavity 4 of the preparation device; closing the negative-pressure chamber 1; opening the negative-pressure suction device of the negative-pressure chamber 1 to make the whole negative-pressure chamber 1 in a negative-pressure state; controlling the temperature of the cooling element 3 to drop gradually to start a cooling process of the sol-state e-liquid: first cooling the sol-state e-liquid in contact with the outer wall of the cooling element 3 into a gel state, that is, cooling and solidifying the sol-state e-liquid from inside to outside; drawing the bubbles in the sol-state e-liquid out of the porous e-liquid containing chamber 2 from inside to outside through the holes in the side wall of the porous e-liquid containing chamber 2; and continuing for a period of time, until the temperature of the cooling element 3 drops to room temperature, the sol-state e-liquid is completely cooled into the gel state, and the bubbles in the sol-state e-liquid are completely removed to obtain the high-penetration gel-state e-liquid 5, where a space occupied by the cooling element 3 forms a hollow chamber of the high-penetration gel-state e-liquid 5.

Preferably, during the cooling process of the sol-state e-liquid, the temperature of the cooling element 3 drops from the initial temperature to 25° C. in 1-3 h and keeps constant at 25° C.

Preferably, during the cooling process of the sol-state e-liquid, the negative-pressure chamber 1 has a constant or variable pressure inside.

Preferably, during the cooling process of the sol-state e-liquid, the initial temperature of the cooling element 3 is 90° C., and a temperature control process of the cooling element 3 includes controlling the temperature of the cooling element 3 to drop from 90° C. to 60° C. at 0.5° C./min and controlling the temperature of the cooling element 3 to drop from 60° C. to 25° C. at 1° C./min and keep constant at 25° C.

Preferably, during the cooling process of the sol-state e-liquid, the pressure in the negative-pressure chamber 1 gradually increases from an initial pressure to atmospheric pressure. The initial pressure is 0-95 KPa, preferably 50-95 KPa, and more preferably 80-90 KPa. The initial pressure can be slightly negative, as long as the bubbles in the e-liquid can be removed.

The temperature and pressure control process depends on the composition and temperature of the sol-state e-liquid, the bubble shape, and other factors.

The third aspect of the present disclosure provides a use of the bubble removal preparation device for a gel-state e-liquid described in the first aspect, which is used to remove bubbles in gel-state e-liquid 5.

The fourth aspect of the present disclosure provides a use of the high-penetration gel-state e-liquid 5 prepared by the preparation method for the high-penetration gel-state e-liquid described in the second aspect for a central-heating e-cigarette, where a heating element of the central-heating e-cigarette is inserted into the hollow chamber of the gel-state e-liquid 5.

The above technical solutions can be combined arbitrarily if there is no conflict.

The present disclosure has the following beneficial effects.

1. The present disclosure first designs the bubble removal preparation device for a gel-state e-liquid. The preparation device includes the negative-pressure chamber, the cooling element, and the porous e-liquid containing chamber. The cooling element is a central cooling element, which cools the sol-state e-liquid from the inside to the outside. The negative-pressure chamber provides a negative-pressure environment for the e-liquid. During the cooling process of the gel-state e-liquid from inside to outside, the bubbles inside the gel-state e-liquid move outward under the negative pressure and finally are completely removed from the e-liquid. As a result, the gel-state e-liquid obtained has no bubbles and has an even or consistent appearance, high transparency, and high aesthetic quality.

2. In a preferred technical solution, the thickness of the e-liquid containing cavity is as small as 0.2-1.5 cm, which reduces the resistance of the bubbles moving outward to facilitate the removal of the bubbles.

3. The gel-state e-liquid 5 prepared by the present disclosure has a cylindrical structure with a hollow chamber into which the heating element of the central-heating e-cigarette can be inserted.

4. The gel-state e-liquid of the present disclosure is also suitable for a sectional central-heating e-cigarette, which is easy to manufacture. Through sectional heating, the gel-state e-liquid can be atomized in sections according to the user's inhalation needs. The gel-state e-liquid does not have to undergo a repeated liquefaction-solidification process, which maximizes the electric energy of the heating element. In addition, the design realizes the atomization with almost no delay, prevents the user from feeling the delay in inhalation, and avoids the chemical change of the chemical substances in the gel-state e-liquid due to repeated heating, reducing the possibility of peculiar smell.

5. Because the gel-state e-liquid can be atomized in sections by sectional heating and the gel-state e-liquid does not have to undergo the repeated liquefaction-solidification process, the gel-state e-liquid does not necessarily have the property of a thermo-reversible solid-liquid phase transition. This greatly expands the selection range of the gelling agent, such that some gelling agents that do not have the property of thermo-reversible solid-liquid phase transition can also be used.

6. A conventional sol-state e-liquid is cooled into the gel state from outside to inside. As the surface of the e-liquid is solidified first, even in a negative-pressure environment, the bubbles inside the e-liquid cannot be removed. In the present disclosure, the cooling element is provided inside the e-liquid containing cavity as a central cooling element, such that the e-liquid is cooled from inside to outside. Meanwhile, under the effect of the negative pressure, the bubbles in the center of the e-liquid can move from the inside to the outside and are finally removed.

REFERENCE NUMERALS

1. negative-pressure chamber; 1-1. upper cover; 1-2. base; 1-3. temperature controller; 1-4. operation display screen; 2. porous e-liquid containing chamber; 3. cooling element; 4. e-liquid containing chamber; and 5. gel-state e-liquid.

DETAILED DESCRIPTION OF THE EMBODIMENTS

The technical solutions of the present disclosure will be further described below with reference to the specific implementations.

Embodiment 1

Figure 1:
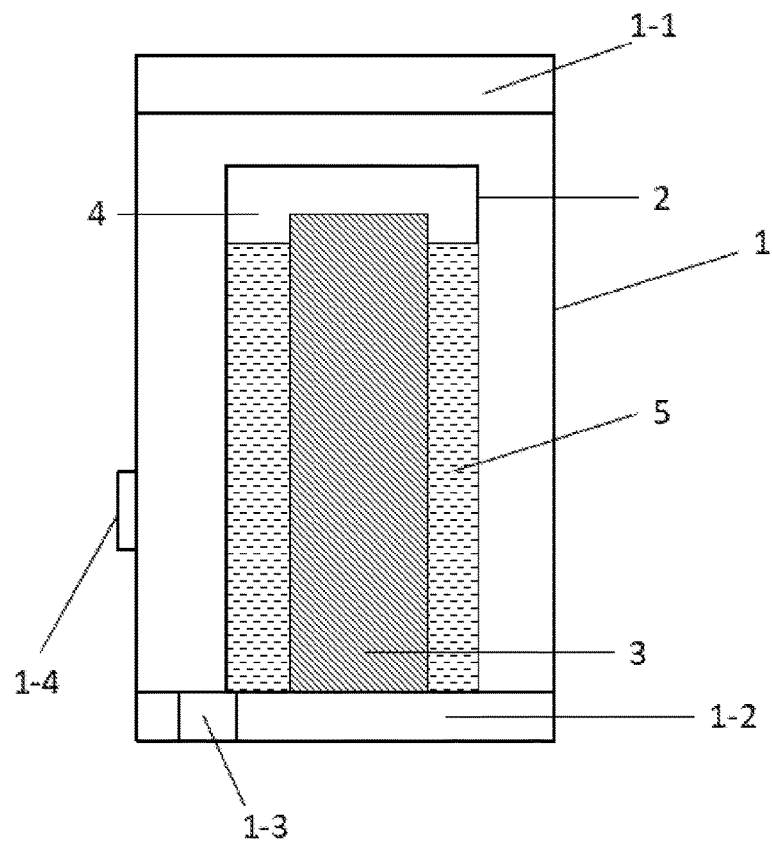
FIG. 1 is a structural diagram of a bubble removal preparation device for a gel-state e-liquid according to the present disclosure.
Figure 2:
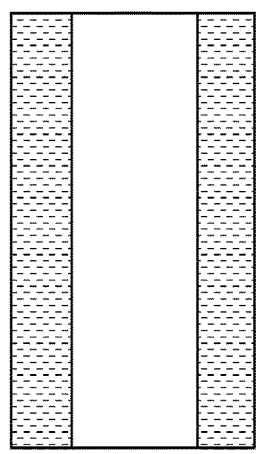
FIG. 2 is a structural diagram of a high-penetration gel-state e-liquid prepared by the present disclosure.

In Embodiment 1, a high-penetration gel-state e-liquid is prepared by a bubble removal preparation device for the gel-state e-liquid of the present disclosure, as shown in FIG. 1.

The first step is to prepare a sol-state e-liquid.

1. A cigarette flavoring is prepared according to the following formula: 50% decolorized tobacco absolute, 30% peppermint oil, and 20% nicotine. These components are stirred at 500 r/min for 15 min until they are mixed well.

2. An e-liquid is prepared according to the following formula: 42% vegetable glycerin, 56% edible propylene glycol, and 2% cigarette flavoring. These components are stirred at 500 r/min for 10 min by an electric stirrer until they are mixed well. A mixture is filtered to obtain a clear e-liquid.

3. 3 parts of fish glue and 5 parts of water are mixed well in a stirring state and are gradually added to 81 parts of the e-liquid. Heating is carried out to 80° C. The temperature is held, and stirring is continued for 1 h.

4. The pH of a reaction system is adjusted to 5, and a mixture of 0.5 parts of xanthan gum and 10.5 parts of water is gradually added. Heating is carried out to 90° C. The temperature is held, and stirring is continued for 3 h, thereby obtaining the gel-state e-liquid.

Bubbles of different sizes are inevitably mixed in the sol-state e-liquid.

The second step is to prepare the gel-state e-liquid with the preparation device of the present disclosure.

A gap between an inner wall of porous e-liquid containing chamber 2 and an outer wall of cooling element 3 forms e-liquid containing chamber 4, which is a hollow cylinder with a wall thickness of 0.5 cm and a height of 10 cm.

The temperature of the cooling element 3 is controlled by temperature controller 1-3, and the initial temperature of the cooling element is controlled to be 90° C.

Upper cover 1-1 is opened, and the sol-state e-liquid prepared in the first step is poured into the e-liquid containing cavity 4 of the preparation device. The upper cover 1-1 is closed, and a negative-pressure suction device of the negative-pressure chamber 1 is opened, such that the whole negative-pressure chamber 1 is in a negative pressure of −50 KPa. The temperature controller 1-3 controls the temperature of the cooling element 3 to gradually drop from 90° C. to 25° C. at 0.5° C./min and keep the temperature constant at 25° C.

During this process, the sol-state e-liquid in contact with the outer wall of the cooling element 3 is first cooled into a gel state, that is, the sol-state e-liquid is cooled and solidified from inside to outside. Meanwhile, the bubbles in the sol-state e-liquid are drawn out of the porous e-liquid containing chamber 2 from inside to outside through the holes in the side wall of the porous e-liquid containing chamber 2. The temperature of the cooling element 3 drops to room temperature, and the temperature is kept for 3 h. The sol-state e-liquid is completely cooled into the gel state, and the bubbles in the sol-state e-liquid are completely removed to obtain the high-penetration gel-state e-liquid 5. The high-penetration gel-state e-liquid 5 is a cylinder with a hollow chamber.

Comparative Embodiment 1

The sol-state e-liquid prepared by sub-step 4 of Embodiment 1 is directly poured into a mold with a rectangular groove, which is 0.5 cm wide and high and 10 cm long. The gel-state e-liquid is prepared by cooling the sol-state e-liquid at room temperature for 8 h. Bubbles still exist in the gel-state e-liquid.

Comparative Embodiment 2

The sol-state e-liquid prepared by sub-step 4 of Embodiment 1 is directly poured into a mold with a rectangular groove, which is 0.5 cm wide and high and 10 cm long. The gel-state e-liquid is prepared by cooling the sol-state e-liquid in a negative-pressure environment of −50 Kpa at room temperature for 8 h. Bubbles still exist in the gel-state e-liquid.

The above described are merely specific implementations of the present disclosure, and the protection scope of the present disclosure is not limited thereto. Any modification or replacement easily conceived by those skilled in the art within the technical scope of the present disclosure should fall within the protection scope of the present disclosure. Therefore, the protection scope of the present disclosure should be subject to the protection scope of the claims.

What is claimed is:

1. A bubble removal preparation device for a gel-state electronic liquid (e-liquid), comprising a negative-pressure chamber with a negative-pressure suction device, wherein the negative-pressure chamber is provided therein with a porous e-liquid containing chamber; the porous e-liquid containing chamber is provided therein with a cooling element; and a gap exists between an inner wall of the porous e-liquid containing chamber and an outer wall of the cooling element, and the gap forms an e-liquid containing cavity; and a side wall of the porous e-liquid containing chamber is provided with holes that allow an aerosol to pass through but not an e-liquid.

2. The bubble removal preparation device for the gel-state e-liquid according to claim 1, wherein the holes each have a regular or irregular shape and have an equivalent diameter of 0.01-2 mm.

3. The bubble removal preparation device for the gel-state e-liquid according to claim 1, wherein the side wall of the porous e-liquid containing chamber has a mesh structure with pores; and the pores have an equivalent diameter of 0.01-2 mm and are equivalent to the holes.

4. The bubble removal preparation device for the gel-state e-liquid according to claim 1, wherein the negative-pressure chamber is further provided therein with a temperature controller, which is connected to the cooling element and configured to control a temperature change of the cooling element.

5. The bubble removal preparation device for the gel-state e-liquid according to claim 1, wherein the e-liquid containing cavity is a hollow cylinder or hollow rectangular solid, the hollow cylinder or hollow rectangular solid has a wall thickness of 0.2-1.5 cm.

6. A preparation method for a high-penetration gel-state e-liquid, wherein the preparation method uses the preparation device for the gel-state e-liquid according to claim 1 and comprises the following steps:
preparing a sol-state e-liquid, wherein the sol-state e-liquid has bubbles naturally mixed during a preparation;
controlling a temperature of the outer wall of the cooling element, and controlling an initial temperature of the outer wall of the cooling element to be greater than or equal to a temperature of the sol-state e-liquid; and
opening the negative-pressure chamber and pouring the sol-state e-liquid into the e-liquid containing cavity of the preparation device; closing the negative-pressure chamber; opening the negative-pressure suction device of the negative-pressure chamber to make the whole negative-pressure chamber in a negative-pressure state; controlling the temperature of the cooling element to drop gradually to start a cooling process of the sol-state, wherein
first cooling the sol-state e-liquid in contact with the outer wall of the cooling element into a gel state, that is, cooling and solidifying the sol-state e-liquid from inside to outside; drawing the bubbles in the sol-state e-liquid out of the porous e-liquid containing chamber from inside to outside through the holes in the side wall of the porous e-liquid containing chamber; and continuing for a period of time, until the temperature of the cooling element drops to a room temperature, the sol-state e-liquid is completely cooled into the gel state, and the bubbles in the sol-state e-liquid are completely removed to obtain the high-penetration gel-state e-liquid, wherein a space occupied by the cooling element forms a hollow chamber of the gel-state e-liquid.

7. The preparation method according to claim 6, wherein during the cooling process of the sol-state e-liquid, the temperature of the cooling element drops from the initial temperature to 25° C. in 1-3 h, and keeps constant at 25° C.; and
during the cooling process of the sol-state e-liquid, the negative-pressure chamber has a constant or variable pressure inside.

8. The preparation method according to claim 6, wherein during the cooling process of the sol-state e-liquid, the initial temperature of the cooling element is 90° C., and a temperature control process of the cooling element comprises dropping from 90° C. to 60° C. at 0.5° C./min, and dropping from 60° C. to 25° C. at 1° C./min and keeping constant at 25° C.

9. The preparation method for a high-penetration gel-state e-liquid according to claim 6, further comprising removing bubbles in a gel-state e-liquid.

10. A bubble removal preparation device for a gel-state electronic liquid (e-liquid) according to claim 1, further comprising: wherein a heating element of the central-heating e-cigarette is inserted into the hollow chamber of the gel-state e-liquid.

* * * * *